United States Patent [19]

Weiser et al.

[11] Patent Number: 5,382,476
[45] Date of Patent: Jan. 17, 1995

[54] RECYCLING OF CURED AMINOPLAST RESINS

[75] Inventors: Juergen Weiser, Schriesheim; Wolfgang Reuther; Erwin Hahn, both of Heidelberg, all of Germany

[73] Assignee: BASF Aktiengesellschaft, Ludwigshafen, Germany

[21] Appl. No.: 247,184

[22] Filed: May 20, 1994

Related U.S. Application Data

[62] Division of Ser. No. 196,493, Feb. 15, 1994.

[30] Foreign Application Priority Data

Feb. 20, 1993 [DE] Germany .............................. 4305298

[51] Int. Cl.6 .......................... B32B 9/04; C14C 9/00
[52] U.S. Cl. ................................. 428/411.1; 428/540
[58] Field of Search .............................. 428/411.1, 540

[56] References Cited

U.S. PATENT DOCUMENTS

| | | | |
|---|---|---|---|
| 4,543,364 | 9/1985 | Ivankee | 521/40 |
| 5,192,809 | 3/1993 | Jones | 521/40 |

*Primary Examiner*—Morton Foelak
*Attorney, Agent, or Firm*—Keil & Weinkauf

[57] ABSTRACT

Cured aminoplast resins are recycled by a process in which said resins, which may contain fillers, are treated with an aqueous sulfite, hydrogen sulfite or disulfite solution and the resulting low molecular weight degradation products are used in chemical processes. The resulting low molecular weight degradation products of cured aminoplast resins are used for coating moldings, for tanning leather and skins and for the production of moldings which contain cured aminoplast resins or consist thereof.

3 Claims, No Drawings

RECYCLING OF CURED AMINOPLAST RESINS

This is a division of application Ser. No. 08/196,493, filed Feb. 15, 1994.

The present invention relates to a process for recycling cured aminoplast resins, in particular for recycling moldings which contain cured aminoplast resins or consist thereof.

Various processes can be used for recycling polymers. A process which is now frequently used comprises mechanical comminution of the polymer, which as far as possible is of one type, and subsequent thermoplastic forming. However, this is feasible only to a limited extent in the case of cured aminoplast resins. Although the cured aminoplast resin can be mechanically comminuted, thermal forming is impossible. It is possible only to bind the milled resin powder by means of suitable additives to give new moldings.

The aminoplast resins include urea resins and triazine resins. Such resins are increasingly being processed to moldings, such as fibers and foams (cf. DE-A-23 64 091, DE-A-27 54 525, DE-A-29 15 457, DE-A-41 23 050 and EP-A-408 947). However, this also gives rise to the question of recycling of these products.

It is an object of the present invention to provide a process for recycling cured aminoplast resins which permits the chemical recycling of moldings which contain aminoplast resins or consist thereof.

We have found that this object is achieved by a process for recycling cured aminoplast resins, in which cured aminoplast resins which may contain fillers are treated with an aqueous sulfite, hydrogen sulfite or disulfite solution and the resulting low molecular weight degradation products are used in chemical processes.

The present invention furthermore relates to low molecular weight degradation products of cured aminoplast resins, which are obtainable by treating cured aminoplast resins which may contain fillers with an aqueous sulfite, hydrogen sulfite or disulfite solution.

The present invention also relates no the use of these low molecular weight degradation products for coating moldings, preferably particle boards, and for tanning hides and skins and for the production of moldings which contain aminoplast resins or consist thereof.

German Patent Application P 42 42 046.6 discloses a process for the chemical degradation of cured aminoplast resins, in which said resins, which may contain fillers, are reacted with a primary and/or secondary amine at from 40° to 250° C.

DD 155 779 discloses a process for removing cured aminoplasts from production plants, in which the cured aminoplasts are dissolved with aqueous, 1–70% strength by weight ammonium, alkali metal or alkaline earth metal sulfite solutions or ammonium, alkali metal or alkaline earth metal hydrogen sulfite solutions or mixtures of these solutions at from 20° to 100° C., and the ratio of aminoplast to be dissolved to solvent is maintained at from 1:1 to 1:10 in the dissolution process.

According to the invention, cured aminoplast resins are, for example, condensates of urea, melamine, benzoguanamine, acetoguanamine, dicyandiamide, guanidine or thiourea with aldehydes, in particular with formaldehyde.

Preferred aminoplast resins are urea resins and/or triazine resins. In the case of the triazine resins, the triazine component is chosen, for example, from the group consisting of benzoguanamine, acetoguanamine and melamine.

Melamine resins are preferably used. Particularly preferred melamine resins here are the condensates of melamine or melamine derivatives and formaldehyde, as described in, for example, EP-A-221 330 and EP-A-408 947.

The aminoplast resin used in the novel process is generally obtained by mechanical comminution of moldings of aminoplasts, for example fibers and foams. The finely divided aminoplast resin obtained can then be used in the novel process without further pretreatment.

The fillers present in the moldings consisting of aminoplasts generally do not present problems here.

Here, fillers are in general fibrous or pulverulent inorganic reinforcing agents or fillers, such as glass fibers, metal powder, metal salts or silicates, e.g. kaolin, talc, barite, quartz or chalk, and pigments, dyes and flameproofing agents may also be present.

According to the invention, the cured aminoplast resin is reacted in general with from 1 to 80, in particular from 20 to 40, % strength aqueous alkali metal, alkaline earth metal or ammonium sulfite solution or alkali metal, alkaline earth metal or ammonium hydrogen sulfite solution at from 20° to 150° C. The weight ratio of solvent to aminoplast resin depends on the corresponding resin and on the concentration of the solution. It is as a rule from 1:1 to 1:30. The pH is generally from 4 to 7. The reaction time is dependent on the temperature and is in general from 3 to 60 hours. At above 100° C., superatmospheric pressure is advantageously employed.

The reaction time is furthermore dependent on the surface of the resin used.

In general, the reaction takes place in such a way that a clear solution is formed after from about 1 to 8 hours, depending on the surface of the milled resin. When melamine/formaldehyde resins are used, precipitation of monomeric melamine derivatives occurs as the reaction progresses, even at about 100° C. After the end of the reaction and cooling to room temperature, these products can be removed in a simple manner, for example by filtration. The mother liquor can be used again for further reactions.

In the case of melamine/formaldehyde resins, the white powder removed by filtration is a defined mixture of methylolmelamines and the corresponding methylolmelamines modified with sulfite groups. The number of methylol groups depends on the melamine/formaldehyde ratio of the resin used. The recovery of the melamine building block from the resin is in general from 70 to 95%.

The use of urea resins generally results within a short time in clear solutions, from which, as a rule, no monomeric products are precipitated. As the reaction progresses, a defined mixture of methylolureas and methylolureas modified with sulfite groups forms.

These solutions can advantageously be used directly in the case of certain reactions. Alternatively, particularly the methylolureas can be precipitated from sufficiently concentrated solutions after the hot solutions have been cooled and can be filtered off. In general, about 50% of the urea present in the crosslinked urea resin can be recovered in this manner. This result is further improved by virtue of the fact that the filtrate solution can be used directly for further reactions.

The novel process can also be carried out in the presence of a water-soluble organic solvent (for example an alcohol).

Cured aminoplast resins, in particular melamine resins, can be converted, according to the invention, into correspondingly functionalized monomeric derivatives which are simple to isolate and can be used for various chemical processes.

It is thus possible to recycle moldings consisting of aminoplast resins in a simple and economical manner.

The novel functionalized monomeric derivatives (low molecular weight degradation products) can be used in chemical processes in the form of the solution present after the novel treatment or in the form of the isolated solid products. Depending on the working up of the solution, the product fractions obtained contain methylol and sulfite substituents in different amounts.

According to European Patent Application No. 92 108 389.5, the methylol-rich product fractions can be incorporated into condensates which can be used as tanning agents for tanning pelts and skins and for retanning leather and skins.

Pelts and skins are understood here as meaning the untanned hide freed from epidermal and subcutaneous connective tissues.

The methylol-rich product fractions are generally used in an amount of from 1 to 5% by weight, based on the condensate.

Furthermore, the novel low molecular weight degradation products can serve as condensation components, in general in an amount of from 1 to 5% by weight, based on the resin, in adhesive resins and impregnating resins, as used in particular for gluing lignocellulose-containing moldings.

A further example is the use of the novel low molecular weight degradation products as modifiers in melamine/formaldehyde resins, as described in DE-A-29 15 457, DE-A-23 64 091, EP-A-221 330 and DE-A-41 23 050. These resins can subsequently be spun, for example, into textile fibers.

In the Examples which follow, parts and percentages are by weight. Degradation of aminoplast resins (Examples 1 to 4)

EXAMPLE 1

20 g of a milled, cured melamine/formaldehyde resin having a molar ratio of melamine to formaldehyde of 1:3 (M:F=1:3) were stirred in 200 g of 40% strength sodium disulfite solution at 100° C. After 5 hours, a clear solution formed, which became very cloudy after a further 20 hours. 48 hours after the beginning of the reaction, the solution was cooled to room temperature and the white precipitate was filtered off, washed with 10 g of water and dried. Yield: 12.5 g According to HPLC analysis (evaluation of the areas), the precipitate consisted of:

| Dimethylolmelaminesulfonic acid | 28 mol % |
|---|---|
| Monomethylolmelaminesulfonic acid | 53 mol % |
| Dimethylolmelamine | 9 mol % |
| Monomethylolmelamine | 10 mol % |

EXAMPLE 2

3.42 kg of a milled, cured melamine/formaldehyde resin (M:F=1:3) were stirred in 49 kg of 20% strength sodium disulfite solution at 100° C. After 6 hours, a clear solution formed, which became very cloudy after a further 12 hours. 24 hours after the beginning of the reaction, the solution was cooled to room temperature and a white precipitate was filtered off, washed with 3 l of water and dried. Yield: 3.04 g According to HPLC analysis (evaluation of the areas), the precipitate consisted of:

| Dimethylolmelaminesulfonic acid | 20 mol % |
|---|---|
| Monomethylolmelaminesulfonic acid | 50 mol % |
| Dimethylolmelamine | 15 mol % |
| Monomethylolmelamine | 15 mol % |

EXAMPLE 3

5 g of a milled, cured melamine/formaldehyde resin (M:F=1:2) were stirred in 200 g of 20% strength sodium disulfite solution at 100° C. After 8 hours, an almost clear solution formed, which became very cloudy after a further 20 hours. 48 hours after the beginning of the reaction, the solution was cooled to room temperature and a white precipitate was filtered off, washed with 10 g of water and dried. Yield: 2.7 g According to HPLC analysis (evaluation of the areas), the precipitate consisted of:

| Dimethylolmelaminesulfonic acid | 7 mol % |
|---|---|
| Monomethylolmelaminesulfonic acid | 44 mol % |
| Dimethylolmelamine | 10 mol % |
| Monomethylolmelamine | 35 mol % |
| Melamine | 4 mol % |

EXAMPLE 4

10 g of a milled, cured melamine/formaldehyde resin (U:F=1:1.55) were stirred in 120 g of 20% strength sodium disulfite solution at 100° C. After 3 hours, a clear solution formed. It was stirred for 48 hours at 100° C and then cooled to room temperature.

The evaluation by quantitative $^{13}$C-NMR gave the following composition of the urea derivatives:

| Methylolurea | 30% |
|---|---|
| Sulfomethylated urea | 70% |

Use of the low molecular weight degradation products (Examples 5 to 7)

EXAMPLE 5

Condensates for Tanning Leather and Skins 141 g (1.5 mol) of phenol were stirred with 168 g (1.65 mol) of concentrated sulfuric acid for 3 hours at 105° C. After the addition of 69 g of water, 81 g (1.35 mol) of urea and 8.13 g (1.86% by weight) of sulfite-modified methylolmelamines (product from Example 3) were added. In addition, 278 g (2.78 mol) of 30% strength aqueous formaldehyde were metered in over 100 minutes at from 65 to 70° C. Stirring was carried out for 15 minutes, after which the pH was brought to 2.0 at from 65 to 70° C. with 138 g (1.73 mol) of 50% strength NaOH. The solution was stirred at 90° C. for 2 hours and then brought to a pH of 7.0 with 22.5 g (0.28 mol) of 50% strength aqueous NaOH. The pH was brought to 3.6 by adding 69 g of a mixture of 30 parts of succinic acid, 42 parts of glutaric acid and 28 parts of adipic acid.

The solids content was brought to 40% with 340 g of water. Viscosity (20° C.): 28 mPa.s pH: 3.6

EXAMPLE 6

Condensation Resin for Coating Particle Boards 219 g of melamine, 6.2 g of sodium disulfite, 11.5 g of a methylol compound (product from Example 3), 208 g of 40% strength aqueous formaldehyde, 18.9 g of butane-1,4-diol, 4.8 g of ethylene glycol, 126 g of water and 1.3 g of sulfanilamide were mixed. The mixture was brought to pH 8.45 with NaOH, and 0.9 ml of diethylethanolamine was added. The mixture was heated to 105° C. until the solution became clear, after which the temperature was reduced to 96° C. Condensation was carried out until a turbidity point TRP (1:5) of 47° C. was reached. Here, turbidity point TRP (1:5) means the temperature at which precipitation occurs in a mixture of resin solution and water in a weight ratio of 1:5.

pH: 10.5  d=1.2359 g/cm$^3$  Viscosity (20° C.)=53 mPa.s  Solids content=55%

EXAMPLE 7

Melamine/Formaldehyde Condensation Resin with the Addition of Methylolated Compound 170.1 g (0.9 mol) of melamine and 61.7 g of an 80% strength aqueous solution of N,N',N''-tris-(5-hydroxy-3-oxapentyl)-melamine (0.1 mol) were mixed with 45.8 g of paraformaldehyde, 3.72 g of bisphenol A, 1.5 ml of diethylaminoethanol and 110.7 g of 40% strength aqueous formaldehyde solution and 1.6 g of a methylol compound. The reaction mixture was refluxed until it had a viscosity of 630 Pa.s (98° C.).

The spinning of the condensation resin to fibers was carried out according to DE-A-41 23 050.

We claim:

1. A method which comprises coating moldings with a low molecular weight degradation product of cured aminoplast resins, which degradation products are obtained by treating cured aminoplast resins with an aqueous sulfite, hydrogen sulfite, or disulfite solution.

2. A method of tanning hides which comprises contacting the hides with a low molecular weight degradation product of cured aminoplast resins, which degradation products are obtained by treating cured aminoplast resins with an aqueous sulfite, hydrogen sulfite, or disulfite solution.

3. A method which comprises molding a low molecular weight degradation product of cured aminoplast resins, which degradation products are obtained by treating cured aminoplast resins with an aqueous sulfite, hydrogen sulfite, or disulfite solution.

* * * * *